(12) United States Patent
Weidenheft, III et al.

(10) Patent No.: US 6,270,288 B1
(45) Date of Patent: Aug. 7, 2001

(54) CABLE FLUSHING LATERAL

(75) Inventors: John H. Weidenheft, III, Norwich; Troy A. Hollingsworth, Uncasville, both of CT (US); Kenneth D. Lambert, Manchester, NH (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 08/837,878

(22) Filed: Mar. 3, 1997

(51) Int. Cl.[7] ..................................... F16L 1/00
(52) U.S. Cl. ............... 405/158; 405/154; 254/134.4; 254/134.3 SC
(58) Field of Search ............................. 405/154, 158, 405/165, 166, 168.1, 168.4; 254/134.4, 134.3 SC

(56) References Cited

U.S. PATENT DOCUMENTS

| | | | |
|---|---|---|---|
| 4,232,981 | * 11/1980 | Lee | 405/158 X |
| 4,822,005 | * 4/1989 | Aleshire | 254/134.4 |
| 5,011,332 | * 4/1991 | Kunze et al. | 405/158 |
| 5,199,689 | * 4/1993 | Proud et al. | 254/134.4 |
| 5,240,351 | * 8/1993 | Holmberg | 405/158 X |
| 5,246,207 | * 9/1993 | Horri et al. | 254/134.4 |

\* cited by examiner

*Primary Examiner*—Tamara L. Graysay
*Assistant Examiner*—Frederick L. Lagman
(74) *Attorney, Agent, or Firm*—Michael J. McGowan; Prithvi C. Lall; Robert W. Gauthier

(57) ABSTRACT

A cable flushing lateral is inserted into a guide tube or conduit through which a cable is to be payed out. The flushing lateral is in the form of a pipe within a pipe with a cylindrical space formed between the pipes. The inner pipe is connected to the upstream side of the guide tube and the outer pipe is connected to the downstream side of the guide tube. The upstream end of the outer pipe has a Y-connection to which a water source is connected such that water under pressure may enter the space between the pipes. The inner pipe has an open nozzle termination at its downstream end and the outer pipe is closed against the inner pipe at its upstream end. The cable to be payed out extends through the guide tube and flushing lateral. The pressure and velocity of the water flowing through the cylindrical space between the inner and outer pipes become uniform. As the water flows past the end of the nozzle, a uniform flow of water surrounds the cable. The flowing water surrounding the cable lubricates the cable and creates a drag on the cable which assists the in paying out the cable through the guide tube.

11 Claims, 2 Drawing Sheets

CABLE FLUSHING LATERAL

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to a system for installing cable in a conduit, and deals more particularly with an apparatus in the form of a cable flushing lateral for improving passage of a towed array cable through a guide tube of a submarine.

(2) Description of the Prior Art

When deploying a towed array from a submarine, the towed array cable passes from a capstan within the submarine through a guide tube, or conduit, which communicates with the medium surrounding the submarine. The capstan pushes the towed array cable through the guide as the cable is payed out. To lower the frictional forces of the cable against the interior of the conduit, water is pumped into the guide tube in the direction in which the cable is payed out. The water inlet to the guide tube consists essentially of an angled T-fitting. The water flowing past the cable creates a drag on the cable and assists in pulling the cable through the conduit. However, the force of the water entering the T-fitting occasionally pushes the cable against the opposite side of the conduit causing the cable to hang up within the conduit. Additionally, some of the water entering the T-fitting is directed opposite the direction of cable travel, resulting in drag forces opposing cable pay out.

Other methods for assisting in passing a cable through a conduit are well known in the art. Kunze et al., U.S. Pat. No. 5,011,332, disclose the use of various cable profiles to produce turbulence which in turn promotes the movement of the cable within the conduit. The profiles essentially consist of radial projections extending from the cable jacket or channels cut into the jacket. Still other methods known in the art utilize drocjues or pigs attached to the end of the cable as in U.S. Pat. No. 4,856,937 to Grocott et al. and U.S. Pat. No. 4,185,809 to Jonnes. Fluid pressure against the drogue or pigs pulls the cable through the conduit. When the cable emerges from the end of the conduit, the drogue or pig is removed and the remainder of the cable can be drawn through the conduit. Such systems would be helpful in conveying the end of the towed array to the point of exit from the conduit but would provide no additional assistance to the continued pay out of the towed array beyond this point. Changing the profile of the towed array or adding drogues or pigs to the array would result in additional costs required to retrofit the towed array or the array handling equipment. Moreover, the increased drag, turbulence and noise that both these methods generate are counter productive to the function and purpose of a towed sonar array.

SUMMARY OF THE INVENTION

Accordingly, it is a general purpose and object of the present invention to provide an improved system for assisting in paying out a cable through a conduit which is less prone to the cable being pushed against the wall of the conduit.

Another object is to provide an improved system for assisting in paying out a cable through a conduit which is effective on cable having a round cross section.

A still further object is to provide an improved system for assisting in paying out a cable through a conduit which continues to assist cable pay out after the end of the cable has exited the conduit.

These objects are accomplished with the present invention by providing a cable flushing lateral in place of the T-fitting currently in use. The flushing lateral is in the form of a pipe within a pipe. The upstream end of the inner pipe is connected to the capstan side of the guide tube and the upstream end of the outer pipe is connected to a water supply. The downstream end of the outer pipe connects with the end of the guide tube which exits the submarine. The inner pipe has an open termination upstream from the outer pipe and guide tube connection, and the outer pipe is closed against the inner pipe at its upstream end. The cable extends through the guide tube and flushing lateral. As water flows into the outer pipe, it surrounds the inner pipe, flowing through the annulus created between the inner and outer pipes and becoming uniform in pressure and velocity. At the inner pipe termination, a uniform ring of water surrounds the cable and flows past the cable into the guide tube and out the exiting end of the guide tube. The flowing water surrounding the cable lubricates the cable and creates a drag on the cable which assists the capstan in paying out the cable through the guide tube. The uniform flow of the water exiting the annulus ensures that the cable is not pushed against the side of the guide tube. The drag on the cable is effective in assisting the capstan even for round cable cross sections and is not dependent on drogues, pigs, or other special shapes placed at the end of the cable.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
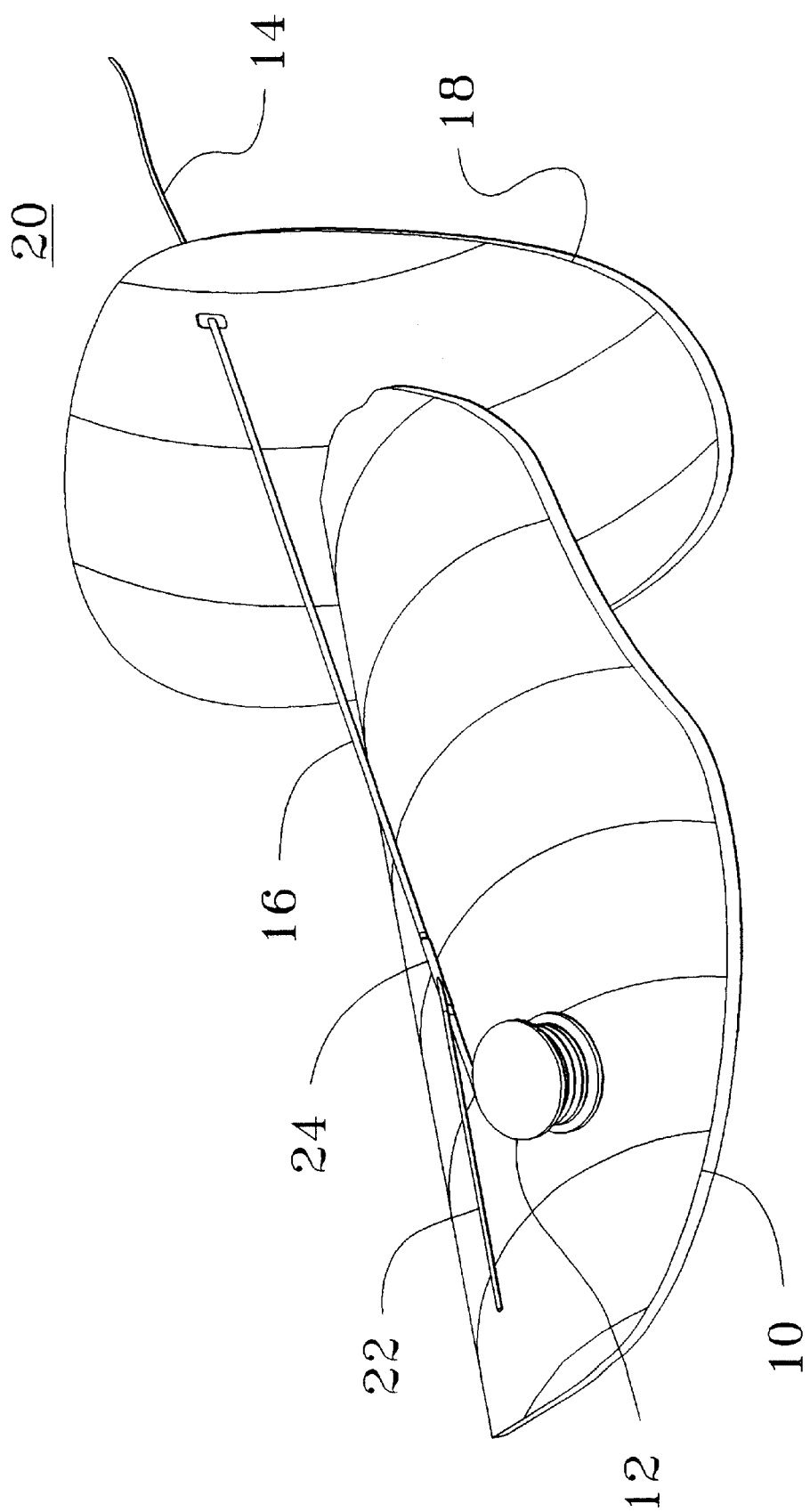
FIG. 1 shows the cable flushing lateral of the present invention installed on the towed array guide tube of a submarine.

Referring now to FIG. 1, there is shown a schematic view of the interior hull 10 of a submarine having a capstan 12 used to pay out a towed array cable 14 through a guide tube 16. Guide tube 16 extends from capstan 12, along interior hull 10 and through exterior hull 18 to the surrounding medium 20. It will be understood that only portions of interior and exterior hulls 10 and 18 have been shown for clarity. The rotation of capstan 12 pushes, or pays out, towed array cable 14 through guide tube 16 and cable 14 is seen exiting from guide tube 16 into medium 20. Flushing water pipe 22 is connected to guide tube 16. Water is pumped into guide tube 16 and out into surrounding medium 20. The drag force exerted on cable 14 assists capstan 12 in paying out cable 14. The method and apparatus for deploying cable 14, as described thus far, are well known in the art. As will be further explained, the use of cable flushing lateral 24 to connect pipe 22 to guide tube 16 results in better lubrication between cable 14 and the interior of guide tube 16 and also results in increased drag on cable 14. Further, cable flushing lateral 24 prevents binding of cable 14 which can occur when the water entering guide tube 16 forces cable 14 against the side of guide tube 16.

Figure 2:
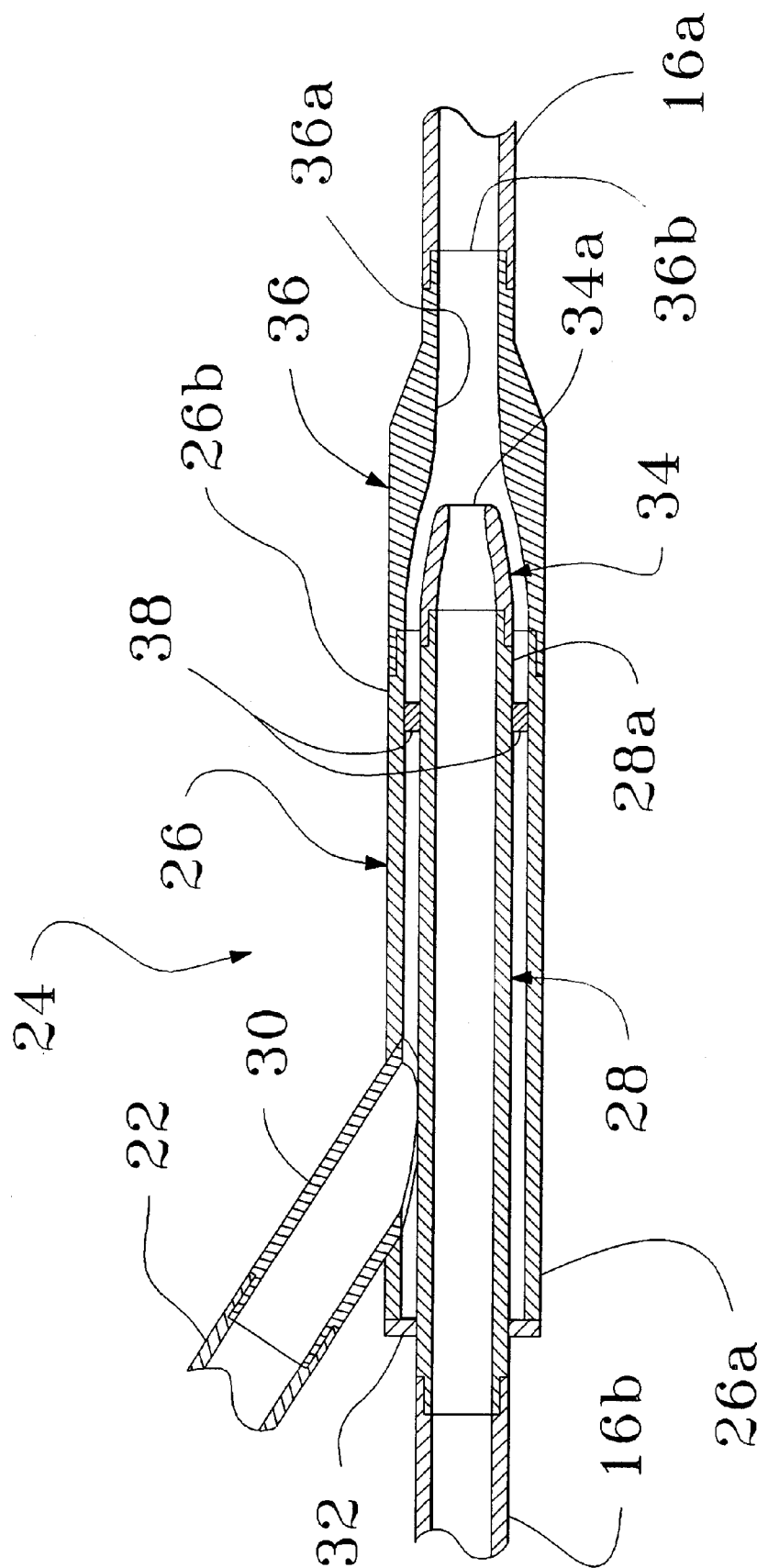
FIG. 2 shows a cross sectional view of a cable flushing lateral.

Referring now to FIG. 2, cable flushing lateral 24 is shown in a cross sectional view taken along the longitudinal axis of guide tube 16. Lateral 24 has an exterior pipe 26 connected to, and in fluid communication with, medium end 16a of guide tube 16. Interior pipe 28 of lateral 24 has an exterior diameter somewhat smaller than the interior diameter of exterior pipe 26 such that interior pipe 28 can be located within, and co-axially with, exterior pipe 26, forming a cylindrical space between exterior pipe 26 and interior pipe 28. The interior diameter of interior pipe 28 is large enough so as to accommodate cable 14. Interior pipe 28 is connected to and in fluid communication with capstan end 16b of guide tube 16. Water pipe 22 is also connected to and in fluid communication with exterior pipe 26 of lateral 24 via Y-connection 30. Flange 32 seals upstream end 26a of exterior pipe 26 nearest capstan end 16b against interior pipe 28. Downstream end 28a of interior pipe 28 terminates within exterior pipe 26. Nozzle 34 is attached at downstream end 28a and serves to reduce the exterior and interior diameters of interior pipe 28 in the direction of cable 14 payout. The reduction is such that the interior diameter of nozzle 34 at free end 34a, or the end furthest from capstan 12, is slightly larger than the exterior diameter of cable 14 with the exterior diameter at free end 34a approximately the same as the interior diameter of interior pipe 28. A similar reducer 36 is attached to guide tube end 26b of exterior pipe 26 furthest from upstream end 26a and connects exterior pipe 26 to guide tube end 16a. Reducer 36 encompasses nozzle 34 with the interior surface 36a of reducer 36 shaped to maintain the separation distance between exterior and interior pipes 26 and 28 over nozzle 34. Termination end 36b of reducer 36 nearest medium end 16a of guide tube 16 has an interior diameter approximately equal to the interior diameter of interior pipe 28. Spacers 38 are axially spaced between guide tube end 26b and downstream end 28b to maintain the separation distance between exterior and interior pipes 26 and 28.

In operation, capstan 12 in FIG. 1 pushes cable 14 through capstan end 16b, interior pipe 28, nozzle 34, reducer 36, medium end 16a and out into medium 20 in FIG. 1. Water under pressure is pumped through water pipe 22, into connection 30 and into exterior pipe 26 surrounding interior pipe 28. The lengths of exterior pipe 26 and interior pipe 28 are sufficient to allow the pressure and velocity of the water to become uniform as it flows towards reducer 36. As the water flows past the free end 34a of nozzle 34, a number of factors combine to direct the greater part of the water towards medium end 16a vice back through nozzle 34. First, the inner diameter of free end 34a is only slightly larger than cable 14 and is smaller than the inner diameter of termination end 36b of reducer 36; second, cable 14 is moving in the direction of desired flow; and third, the pressure and flow of the water are directed towards medium end 16a. The uniform pressure and velocity of the water flowing past free end 28b surrounds cable 14 and serves to maintain cable 14 at the centerline of medium end 16a, reducing the opportunity for cable 14 to contact the interior of medium end 16a and thus bind up. Further, the flowing water creates a drag on cable 14 which assists capstan 12 in paying out cable 14. The uniform flow also reduces turbulence such that a greater portion of flow energy is directed to creating the drag on cable 14. Reduced turbulence also results in decreased noise of operation which can be critical for submarine operations in general, and sonar effectiveness in particular.

What has thus been described is a device for providing a motive force to a cable being payed out through a guide tube, or conduit. The device is a cable flushing lateral which is connected to the conduit and to a water source. The flushing lateral is in the shape of a Y-connection having a straight through portion and an angled portion. The straight through portion is connected at each end to the guide tube and the angled portion is connected to the water source. The straight through portion has an inner pipe connected to the upstream end of the guide tube and an outer pipe which surrounds the inner pipe and is connected to the downstream portion of the guide tube. The diameter of the inner pipe is approximately that of the guide tube. The outer pipe has a larger diameter such that a cylindrical space is formed between the two pipes. The angled portion of the flushing lateral is connected to the outer pipe such that water flowing into the lateral is directed into the cylindrical space between the pipes. The downstream end of the inner pipe ends in an open nozzle which reduces the inner and outer diameters of the inner pipe. The downstream end of the outer pipe has a reducer which essentially matches the shape of the nozzle so as to maintain the spacing between the pipes. The inner diameter at the downstream end of the reducer is the same as the guide tube. The outer pipe is closed against the inner pipe at its upstream end. The cable extends through the guide is tube and flushing lateral. As water flows into the outer pipe, it surrounds the inner pipe, flowing through the cylindrical space created between the inner and outer pipes and becoming uniform in pressure and velocity. As the water flows past the end of the nozzle, a uniform flow of water surrounds the cable. The flowing water surrounding the cable lubricates the cable and creates a drag on the cable which assists the capstan in paying out the cable through the guide tube. The uniform flow surrounding the cable helps to ensure that the cable is maintained at the centerline of the guide tube and is not pushed against the side of the guide tube. Because the drag on the cable is effective even for round cable cross sections, the device is not dependent on having a specially shaped cable, or in providing drogues, pigs, or other special shapes placed at the end of the cable.

Obviously many modifications and variations of the present invention may become apparent in light of the above teachings. For example, the exact shapes and configurations of the particular components shown can be changed to suit the cable to be payed out and the guide tube or conduit being used. Any suitable connection between the cable flushing lateral and the guide tube may be used such as welded, soldered, or screw jointed. For use in seawater, such as the use described herein, the flushing lateral is fabricated from a copper-nickel alloy. Any suitable material may be substituted depending on the conditions to be encountered.

In light of the above, it is therefore understood that within the scope of the appended claims, the invention may be practiced otherwise than as specifically described.

What is claimed is:

1. A device inserted in a conduit for advancing a cable through the conduit from an upstream position to a downstream position, the device comprising:

an interior conduit section having an upstream end connected to said conduit and an open end opposite the upstream end, the cable passing from the conduit connected at the upstream end, through the interior conduit section and out the open end;

an exterior conduit section having a first interior diameter larger than a first outer diameter of the interior conduit section, the exterior conduit section surrounding the interior conduit section forming a cylindrical space therebetween, the exterior conduit section having a downstream end connected to said conduit at a point removed in the direction of travel of the cable from the open end of said interior conduit section and having a closed end opposite the downstream end, the cable passing from the open end of the interior conduit section, through the downstream end of the exterior conduit section and into the conduit connected at the downstream end of the exterior conduit section;

a flange affixed to, and extending between, the closed end of the exterior conduit section and the interior conduit section, the interior conduit section extending beyond the flange in the direction opposite the direction of advancement of the cable, the flange closing the cylindrical space at the closed end of the exterior conduit section; and a fluid medium connector for introducing a fluid medium under pressure into the cylindrical space, the fluid, medium flowing in the direction of advancement of the cable, the fluid medium flowing through the cylindrical space, past the open end, through the downstream end and into the conduit connected to the downstream end, the fluid medium surrounding the cable, the flow of the fluid medium exerting a drag force on the cable, the drag force tending to pull the cable through the conduit.

2. The device of claim 1 wherein said open end further comprises a nozzle, the nozzle decreasing the first exterior diameter and a second interior diameter of the interior conduit section in the direction of advancement of the cable such that the first exterior diameter furthest from the upstream end is approximately equal to the second interior diameter at the upstream end and the second interior diameter furthest from the upstream end is slightly larger than the cable.

3. The device of claim 2 wherein said downstream end comprises a reducer, the reducer decreasing the first interior diameter of the exterior conduit section proportionate to the nozzle decrease, the proportionate decrease maintaining the space between the interior and exterior conduit sections.

4. The device of claim 3 wherein the fluid medium connector connects to the exterior conduit section so as to form an acute angle between the direction of advancement of the cable and the direction of introduction of the fluid medium into the exterior conduit section.

5. The device of claim 4 further comprising spacers radially spaced about the open end between the interior and exterior conduit sections for maintaining the interior and exterior conduit sections in a spaced relationship.

6. The device of claim 1 wherein said downstream end comprises a reducer for decreasing the first interior diameter from a point nearest the open end to the downstream end such that the first interior diameter at the downstream end is equal to a second interior diameter of the interior conduit section.

7. The device of claim 6 wherein the fluid medium connector connects to the exterior conduit section so as to form an acute angle-between the direction of advancement of the cable and the direction of introduction of the fluid medium into the exterior conduit section.

8. The device of claim 7 further comprising spacers radially spaced about the open end between the interior and exterior conduit sections for maintaining the interior and exterior conduit sections in a spaced relationship.

9. The device of claim 1 wherein the fluid medium connector connects to the exterior conduit section so as to form an acute angle between the direction of advancement of the cable and the direction of introduction of the fluid medium into the exterior conduit section.

10. The device of claim 9 further comprising spacers radially spaced about the open end between the interior and exterior conduit sections for maintaining the interior and exterior conduit sections in a spaced relationship.

11. The device of claim 1 further comprising spacers radially spaced about the open end between the interior and exterior conduit sections for maintaining the interior and exterior conduit sections in a spaced relationship.

* * * * *

UNITED STATES PATENT AND TRADEMARK OFFICE
CERTIFICATE OF CORRECTION

| | | |
|---|---|---|
| PATENT NO. | : 6,270,288 B1 | Page 1 of 1 |
| APPLICATION NO. | : 08/837878 | |
| DATED | : August 7, 2001 | |
| INVENTOR(S) | : John H. Wiedenheft, III et al. | |

It is certified that error appears in the above-identified patent and that said Letters Patent is hereby corrected as shown below:

On the Title Page

Item (12) should read Wiedenheft, III et al.

Column 1, Item (75) change Inventors name from John H. Weidenheft to John H. Wiedenheft.

Signed and Sealed this

Eighth Day of September, 2015

Michelle K. Lee
*Director of the United States Patent and Trademark Office*